United States Patent
Tremblay et al.

(10) Patent No.: US 6,401,175 B1
(45) Date of Patent: Jun. 4, 2002

(54) SHARED WRITE BUFFER FOR USE BY MULTIPLE PROCESSOR UNITS

(75) Inventors: Marc Tremblay, Menlo Park; Andre Kowalczyk; Anup S. Tirumala, both of San Jose, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/410,843

(22) Filed: Oct. 1, 1999

(51) Int. Cl.[7] .............................................. G06F 12/00
(52) U.S. Cl. ...................... 711/147; 711/131; 711/143; 711/149
(58) Field of Search ................................ 711/147, 149, 711/143, 131, 130, 144, 148, 153, 156, 207

(56) References Cited

U.S. PATENT DOCUMENTS

| | | | | |
|---|---|---|---|---|
| 5,185,875 A | * | 2/1993 | Chinnaswamy et al. | 395/425 |
| 5,428,761 A | * | 6/1995 | Herlihy et al. | 395/425 |
| 5,561,779 A | * | 10/1996 | Jackson et al. | 395/449 |
| 5,615,402 A | | 3/1997 | Quattromani et al. | 395/800 |
| 5,765,196 A | * | 6/1998 | Liencres et al. | 711/134 |
| 5,860,158 A | | 1/1999 | Pai et al. | 711/118 |
| 6,078,997 A | * | 6/2000 | Young et al. | 711/144 |
| 6,092,172 A | * | 7/2000 | Nishimoto et al. | 711/203 |
| 6,282,617 B1 | * | 8/2001 | Tirumula et al. | 711/133 |

FOREIGN PATENT DOCUMENTS

| EP | 394620 A2 | 10/1990 | G06F/12/08 |
|---|---|---|---|
| EP | 793178 A2 | 9/1997 | G06F/12/08 |

* cited by examiner

*Primary Examiner*—Matthew Kim
*Assistant Examiner*—Stephen Elmore
(74) *Attorney, Agent, or Firm*—Skjerven Morrill LLP; Shireen Irani Bacon

(57) ABSTRACT

A shared write back buffer for storing data from a data cache to be written back to memory. The shared write back buffer includes a plurality of ports, each port being associated with one of a plurality of processing units. All processing units in the plurality share the write back buffer. The shared write back buffer further includes a data register for storing data provided through the input ports, an address register for storing addresses associated with the data provided through the input ports, and a single output port for providing the data to the associated addresses in memory.

7 Claims, 6 Drawing Sheets

SHARED WRITE BUFFER FOR USE BY MULTIPLE PROCESSOR UNITS

CROSS-REFERENCE TO RELATED APPLICATION

This application relates to U.S. patent application Ser. No. 09/204,480, filed Dec. 12, 1998, and entitled, "A Multiple-Thread Processor for Threaded Software Applications," and naming Marc Tremblay and William Joy as inventors, the application being incorporated herein by reference in its entirety.

BACKGROUND

1. Field of the Invention

The field of the invention relates to resources shared by multiple processing units and more particularly to a shared write back buffer within a data cache unit that is shared by multiple processing units.

2. Discussion of Related Art

Processors have attained widespread use throughout many industries. A goal of any processor is to process information quickly. One technique which is used to increase the speed with which the processor processes information is to provide the processor with an architecture which includes a fast local memory called a cache. Another technique which is used to increase the speed with which the processor processes information is to provide a processor architecture with multiple processing units.

A cache is used by the processor to temporarily store instructions and data. A cache which stores both instructions and data is referred to as a unified cache; a cache which stores only instructions is an instruction cache and a cache which stores only data is a data cache. Providing a processor architecture with either a unified cache or an instruction cache and a data cache is a matter of design choice.

A factor in the performance of the processor is the probability that a processor-requested data item is already in the cache. When a processor attempts to access an item of information, it is either present in the cache or not. If present, a cache "hit" occurs. If the item is not in the cache when requested by the processor, a cache "miss" occurs. It is desirable when designing a cache system to achieve a high cache hit rate, or "hit ratio".

After a cache miss occurs, the information requested by the processor must then be retrieved from memory and brought into the cache so that it may be accessed by the processor. A search for an item of information that is not stored in the cache after a cache miss usually results in an expensive and time-consuming effort to retrieve the item of information from the main memory of the system. To maximize the number of cache hits, data that is likely to be referenced in the near future operation of the processor is stored in the cache. Two common strategies for maximizing cache hits are storing the most recently referenced data and storing the most commonly referenced data.

In most existing systems, a cache is subdivided into sets of cache line slots. When each set contains only one line, then each main memory line can only be stored in one specific line slot in the cache. This is called direct mapping. In contrast, each set in most modem processors contains a number of lines. Because each set contains several lines, a main memory line mapped to a given set may be stored in any of the lines, or "ways", in the set.

When a cache miss occurs, the line of memory containing the missing item is loaded into the cache, replacing another cache line. This process is called cache replacement. In a direct mapping system, each line from main memory is restricted to be placed in a single line slot in the cache. This direct mapping approach simplifies the cache replacement process, but tends to limit the hit ratio due to the lack of flexibility with line mapping. In contrast, flexibility of line mapping, and therefore a higher hit ratio, can be achieved by increasing the level of associativity. Increased associativity means that the number of lines per set is increased so that each line in main memory can be placed in any of the line slots ("ways") within the set. During cache replacement, one of the lines in the set must be replaced. The method for deciding which line in the set is to be replaced after a cache miss is called a cache replacement policy.

Several conventional cache replacement policies for selecting a datum in the cache to overwrite include Random, Least-Recently Used (LRU), Pseudo-LRU, and Not-Most-Recently-Used (NMRU). Random is the simplest cache replacement policy to implement, since the line to be replaced in the set is chosen at random. The LRU method is more complex, as it requires a logic circuit to keep track of actual access of each line in the set by the processor. According to the LRU algorithm, if a line has not been accessed recently, chances are that it will not be accessed any more, and therefore it is a good candidate for replacement. Another replacement policy, NMRU, keeps track of the most recently accessed line. This most recently accessed line is not chosen for replacement, since the principle of spatial locality says that there is a high probability that, once an information item is accessed, other nearby items in the same line will be accessed in the near future. The NMRU method requires a logic circuit to keep track of the most recently accessed line within a set. In all cache replacement policies, the line selected for replacement may be referred to as a "candidate."

Once a candidate is selected, further processing must occur in the cache in order to ensure the preservation of memory coherency. If the contents of the candidate has been altered in the cache since it was retrieved from memory, then the candidate is "dirty" and a memory incoherency exists. Before the contents of the dirty candidate can be replaced with the new information requested by the processor, the current contents of the dirty candidate must be updated to memory. This operation is called a "write back" operation. While the implementation of such a scheme allows reduced bus traffic because multiple changes to a cache line need be loaded into memory only when the cache line is about to be replaced, a drawback to the write back operation is delay. That is, access to the cache is slowed or even halted during a write back operation.

SUMMARY

A shared write back buffer for storing data from a data cache to be written back to memory. The shared write back buffer includes a plurality of ports, each port being associated with one of a plurality of processing units. In one embodiment, the ports receive address data originating from one of the plurality of processing units. All processing units in the plurality share the write back buffer. The shared write back buffer further includes data bank that includes a plurality of data registers. The data register stores data provided through the input ports. The write back buffer also includes an address bank that includes a plurality of address registers. An address register stores addresses associated with the data provided through the input ports. In one embodiment, the address bank further includes a plurality of full indicators. The write back buffer includes a single output port for providing the data to the associated addresses in memory.

In one embodiment, the write back buffer further comprises a data selector circuit and an address selector circuit. The data selector circuit selects, for each storage data, one of the data registers to receive the storage data. The address selector circuit selects for each address data, one of the address registers to receive the address inputs.

In one embodiment, the shared write back buffer is included in a computer system, where the computer system also includes a plurality of processing units and a main memory. In one embodiment, the computer system also includes a data selector circuit and an address selector circuit as described above. In one embodiment, the computer system also includes a data cache unit, where the data cache unit includes a write back buffer, directory array, and data array.

The shared write back buffer stores storage data that is to be written to main memory, where the shared write back buffer receives the storage data from any of the plurality to processing units. That is, the processing units share the write back buffer, so that the write back buffer may receive storage data from any and all of the processing units. In one embodiment, the computer system includes two processing units.

In one embodiment, the data bank includes two data registers. In one embodiment, the address bank includes two address registers.

In one embodiment, the address data from a processing unit is forwarded to the storage data inputs from the data array.

In one embodiment, the address data from a processing unit is forwarded to the address inputs from the directory array.

The present invention will be more fully understood in light of the following detailed description taken together with the accompanying drawings.

BRIEF DESCRIPTION OF THE DRAWINGS

The use of the same reference numbers in different figures indicates the same or like elements.

DETAILED DESCRIPTION

The present invention relates to a shared write back buffer that is shared by multiple processing units. The state of the write back buffer is factored into the cache replacement policy that is executed upon a cache "miss". As with many prior art cache replacement policies, the status of the requested set is taken into account. Status bits indicate the state of the set, including which ways are available to be overwritten (i.e., invalid), which ways have recently been used for a cache miss, and which ways are "dirty" and therefore are candidates for a write back operation. In addition, the present invention also takes into account whether the write back buffer is crowded. This allows more efficiency than prior art systems. If the write back buffer is crowded, a dirty way is not selected unless there are no non-dirty candidates. Triggering of a write back operation is thus prevented until both the write back buffer is crowded and all ways in the set are both valid and dirty. The description is intended to be illustrative of the invention and should not be taken to be limiting.

Figure 1:
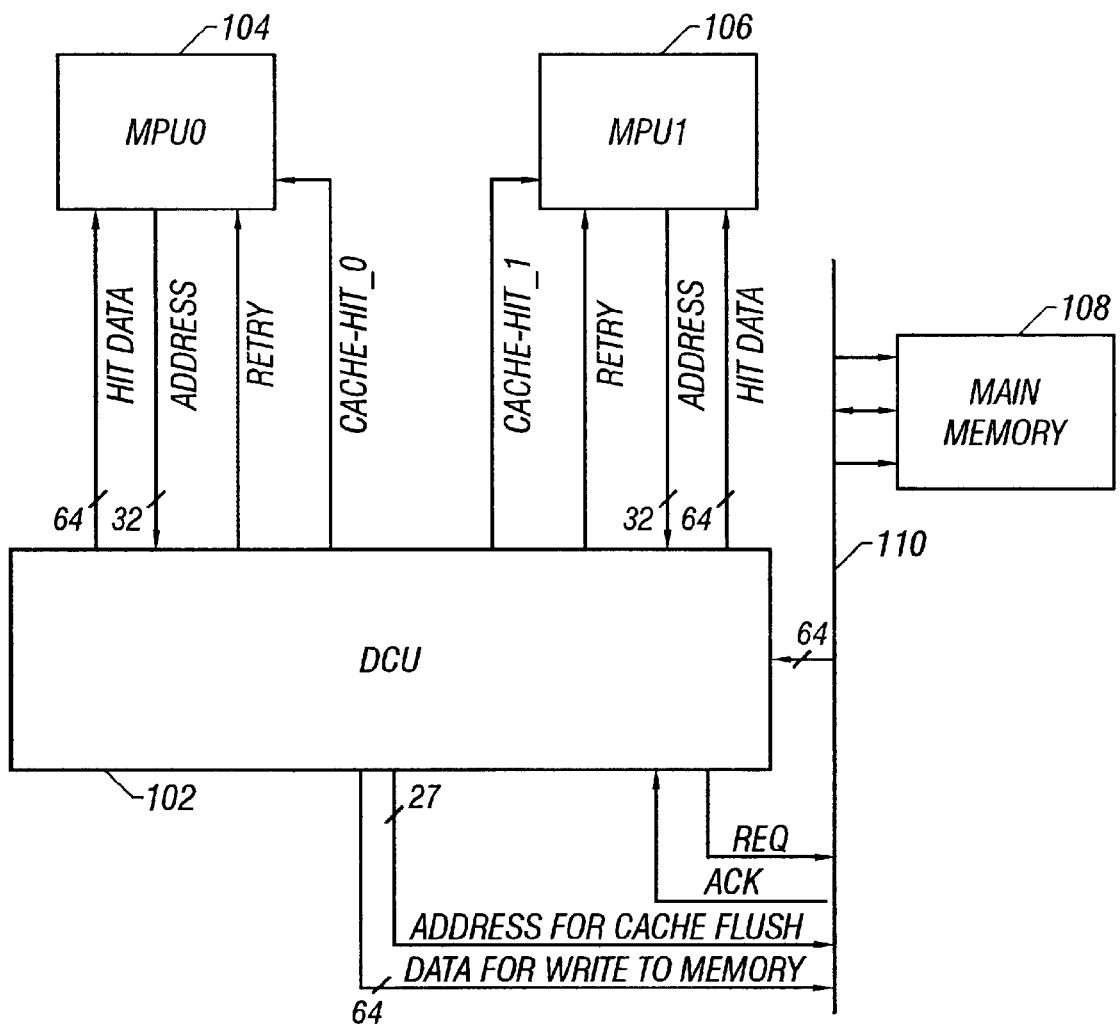
FIG. 1 shows a computer system in accordance with an embodiment of the present invention.

FIG. 1 shows a computer system 100 in accordance with the present invention. Computer system 100 includes a data cache unit (DCU) 102 coupled to first processing unit 104 (MPU0) and second processing unit 106 (MPU1). First processing unit 104 and second processing unit 106 may be media processor units. For example, U.S. application No. 09/204,480 filed by inventors Marc Tremblay and William Joy, entitled "A Multiple-Thread Processor For Threaded Software Applications", which is hereby incorporated by reference, sets forth a media processor unit in accordance with the invention.

FIG. 1 illustrates that the data cache unit 102 is coupled to each MPU as well as to main memory. First processing unit 104 is coupled to data cache unit 102 via a 64-bit data path, a 32-bit address path, a retry path and a hit path. Second processing unit 106 is also coupled to data cache unit 102 via a 64-bit data path, a 32-bit address path, a retry path and a hit path. The data cache unit 102 is coupled to a conventional main memory 108 by conventional bus 110. More specifically, data cache unit 102 is coupled to bus 110 via a 64-bit data-in path, as well as a 64-bit data-out path, and a 27-bit buffer flush address path.

Figure 2:
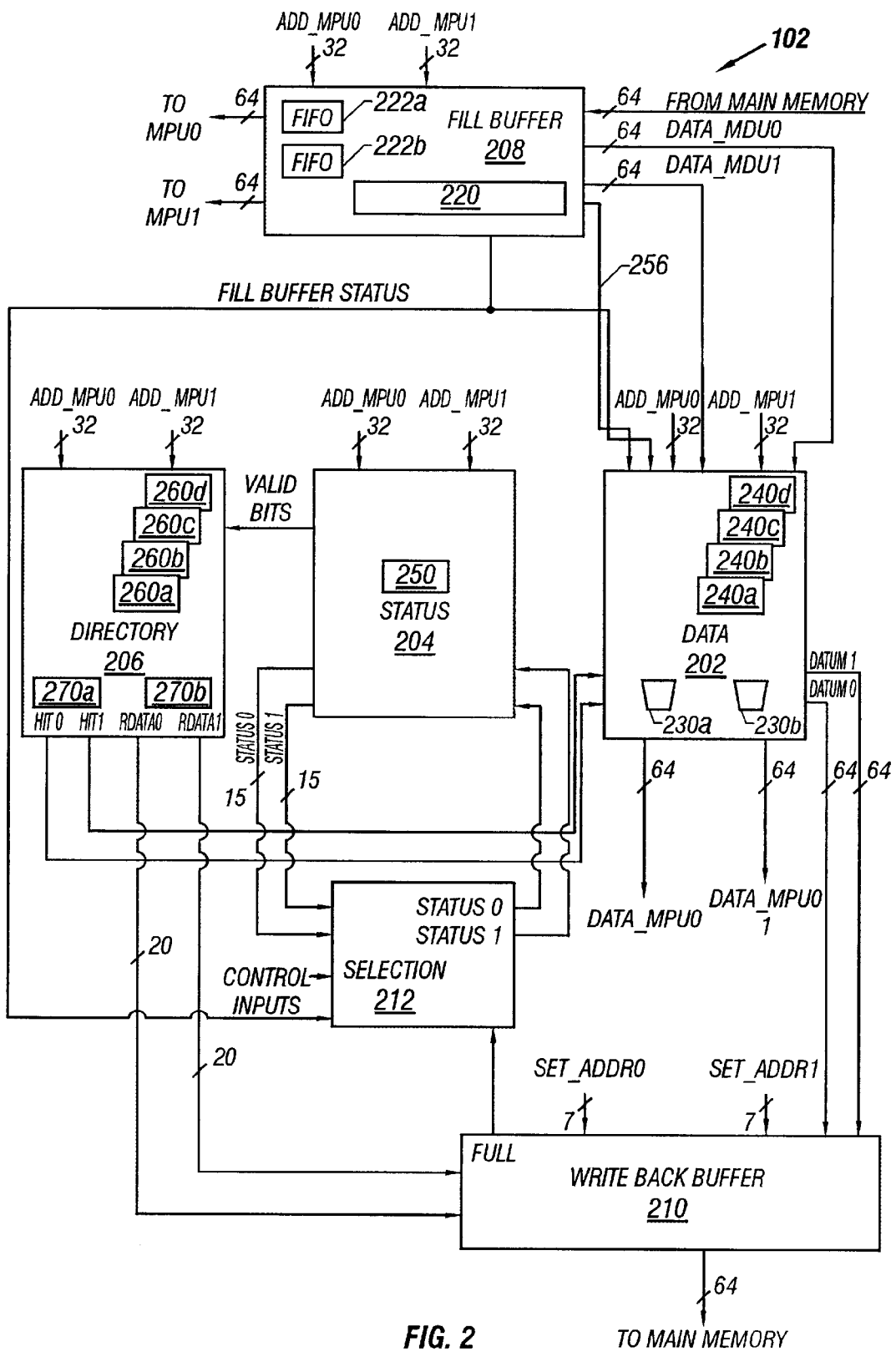
FIG. 2 shows a block diagram of a data cache unit of the computer system of FIG. 1.

FIG. 2 illustrates in greater detail the data cache unit 102, which stores data for faster access by first processing unit 104 and second processing unit 106 than would be possible by accessing main memory 108. FIG. 2 shows that data cache unit 102 comprises data array 202, status array 204, directory array 206, fill buffer 208, shared write back buffer 210, and selection circuit 212. Each of these constituents of the data cache unit 102 is discussed in further detail below. Data array 202 is discussed first, followed by discussions of directory array 206, status array 204, selection circuit 212, fill buffer 208, and, finally, the write back buffer 210 of the present invention.

FIG. 2 illustrates that data array 202 receives a 32-bit address signal (add MPU0) from first processing unit 104, a 32-bit address signal (add_MPU1) from second processing unit 106, and a 256-bit data signal from fill buffer 208. Data array 202 also receives first and second hit signals from directory array 206 (hit0, hit1). Data array 202 provides a 64-bit data signal to first processing unit 104 (datum0) and a 64-bit data signal to second processing unit 106 (datum1). Data array 202 also provides the 64-bit data signal datum0 and the 64-bit data signal datum1 to write back buffer 210.

Data array 202 stores the data of data cache unit 102. In the preferred embodiment, data array 202 includes four logical banks 240a–240d, each bank storing 128 lines of 256 bits. A suitable implementation of a logical bank 240 is a static random access memory (SRAM). FIG. 2 shows that data array 202 also comprises two multiplexers 230a, 230b. The operation of data array 202 is described in more detail below.

Regarding the directory array 206, FIG. 2 illustrates that directory array 206 receives the 32-bit address signal (add_MPU0) from first processing unit 104 and the 32-bit address signal (add_MPU1) from second processing unit 106. Directory array 206 also receives the first and second 15-bit status signals from status array 204 (status0, status1). Directory array 206 provides first and second hit signals to data array 202. Directory array 206 also provides first and second data-out signals containing a tag address (rdata0, rdata1) to write back buffer 210.

Directory array 206 stores addresses of data stored in a corresponding location within data array 202 of data cache unit 102. Directory array 206 includes four logical banks 260a–260d that each stores 128 20-bit wide lines, where the 20-bits correspond to the 20 more significant bits of the 32-bit address. A datum is stored in a predetermined location within one of the four logical banks 260a–260d. Each of the four predetermined locations is labeled a "way". A "set" includes the four possible "ways" in which a datum can be stored. A suitable implementation of a logical bank 260 is a static random access memory (SRAM). FIG. 2 shows that directory array 206 also includes two comparators 270a, 270b. The operation of directory array 206 is described in more detail below.

Turning now to the status array, FIG. 2 illustrates that status array 204 receives the 32-bit address signal (add_MPU0) from first processing unit 104 and the 32-bit address signal (add_MPU1) from second processing unit 106. Status array 204 also receives first and second 15-bit status signals from selection circuit 212 (status0, status1). Status array 204 provides valid bits to the directory array 206. Status array 204 also provides a first and second 15-bit status signal (status0, status1) to selection circuit 212.

Status array 204 stores status words that include information concerning each "way" of data array 202. Status array 204 includes one or more logical banks 250 for storing 128 status words that are 15 bits each. A suitable implementation of a logical bank 250 is a static random access memory (SRAM). The operation of status array 204 is described in more detail later.

Figure 3:
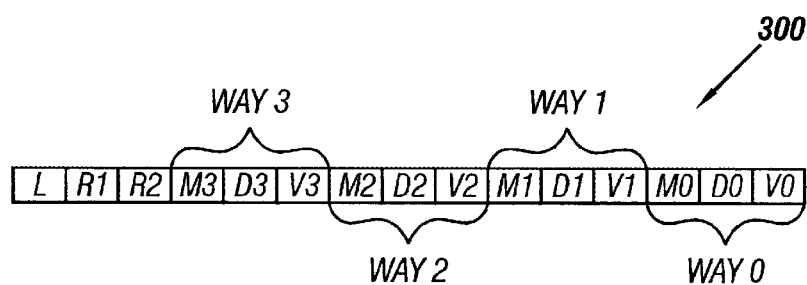
FIG. 3 shows a sample status word.

Still referring to FIG. 2, our discussion of the data cache unit 102 constituents turns to the selection circuit 212. Selection circuit 212 generates a new 15-bit status word to be updated a cycle after every load/store access and stored in the status array 204. (FIG. 3 illustrates the format of the 15-bit status word, as is discussed immediately below.) The selection circuit 212 also generates the victim number for cache replacement and indicates if the candidate is dirty, signifying that the candidate's current data must be loaded into the write back buffer before it is overwritten. FIG. 2 illustrates that the selection circuit 212 receives from the status array 204 the status word for the access. The selection circuit then modifies the status word. For example, the dirty bit may need to be set (on a store hit), the replacement bits may need to be updated and the valid bit may need to be cleared. The updated status word 300 is then set back to the status array.

FIG. 3 shows a sample status word 300. Status word 300 is a 15-bit word that indicates lock status, a reference way, whether each of four ways, 0–3, has been utilized on a previous cache miss, whether each of the four ways is dirty, and whether each of the four ways is valid. More specifically, bits R1 and R2 represent the reference way to be used by the selection circuit 212 to implement the cache replacement algorithm, as discussed below. For instance, in a NMRU cache replacement policy, bits R1 and R2 would contain the most-recently-used way for a particular set. In a LRU cache replacement policy, bits R1 and R2 would contain the least-recently-used way. Bits M0–M3 indicate whether the corresponding way has already been taken due to a cache miss. This M indicator simplifies the victim number generation logic in the cache replacement algorithm. Bits V0–V3 indicate whether the corresponding way is valid. A valid way is a way that is free of meaningful data and therefore is a likely candidate to be overwritten on a cache miss. In other words, no new data has been fetched into an invalid way since that way was last flushed to memory. Bits D0–D3 indicate whether the corresponding way is dirty. That is, not only does that way contain meaningful data, but the data has been changed since it was retrieved from memory, and a memory incoherency therefore exists. Bit L, the lock bit, indicates that the cache line is locked in place and cannot be moved. The lock bit is set, for example, upon an atomic load hit. Setting the lock bit operates to disable any access to the set until the lock bit is reset.

Selection circuit 212 of data cache unit 102 implements a cache replacement policy by changing the "miss" bit in the appropriate status word to reflect which "way" is a candidate for replacement. Selection circuit 212 receives status words associated with requested data from status array 204 and provides an updated status word to status array 204 where applicable.

Figure 5:
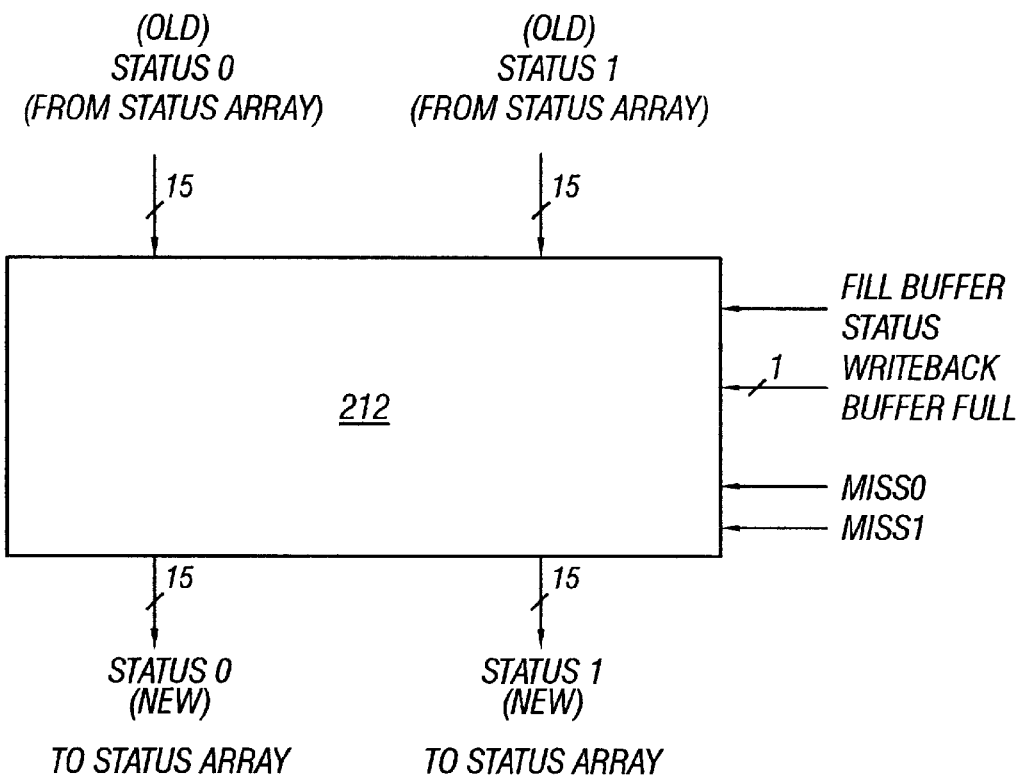
FIG. 5 shows a block diagram of a selection circuit of the data cache unit of FIG. 2.

FIG. 5 shows a block diagram of selection circuit 212 which updates the status array 204 and implements a multi-variable replacement policy 700 to generate a victim (or "candidate") number to be used for cache overwrite upon a cache miss. Selection circuit 212 receives the 15-bit status0 signal and the 15-bit status1 signal from the status array 204 as well as the full bits f1, f2 from the write back buffer 210. Selection circuit 212 also receives as control inputs a miss0 and miss1 signal. These 4-bit miss signals are logical inversions of the hit0 and hit1 signals that are sent from the directory array 206 to the data array 202. Another input to the selection circuit 212 is a fill buffer status from the fill buffer 208. Selection Circuit 212 provides an updated 15-bit status0 signal and an updated 15-bit status1 signal to status array 204. The operation of selection circuit 212 will be discussed in more detail below.

The fill buffer 208, the next constituent of the data cache unit 102 to be discussed, is used when a cache miss occurs. A cache miss occurs when the line of memory requested by a processor MPU0, MPU1 is not already in the data cache unit 102. Fill buffer 208 receives the 32-bit address signal (add_MPU0) from first processing unit 104 and the 32-bit address signal (add_MPU1) from second processing unit 106. Fill buffer 208 receives a 64-bit data signal from main memory 108 and holds the data from main memory 108 that is to be stored in the data cache unit 102. FIG. 2 illustrates that fill buffer 208 includes a data register 220 that stores data to be written into data array 202. Data register 220 stores 256 bits of data. Fill buffer 208 provides the 256-bit data signal to data array 202. Fill buffer 208 also sends a 64-bit data signal, data_MPU0, and a second 64-bit data signal, data_MPU1, to the data array 202. Finally, fill buffer 208 also provides a fill buffer hit status to the data array 202 and to the selection circuit 212.

FIG. 2 further illustrates that fill buffer 208 also includes an address register 222 that stores addresses and certain status bits associated with data to be written into the data array. Address register also stores the "way" to which the data is to be stored in the data array. The operation of fill buffer 208 is described in more detail below.

Finally, our discussion of the data cache unit 102 constituents turns to the write back buffer 210 of the present invention. Write back buffer 210 serves, when a cache miss occurs, as a temporary place holder for dirty blocks until they can be pushed to memory. A "dirty" block is a block whose contents have been modified since the block was last obtained from main memory 108. Before a dirty block is stored in the write back buffer 210, the selection circuit 212 assigns it a "victim" number that is stored in the status word 300 (see M0, M1, M2, M3 in FIG. 3, discussed below). A victim number is the particular way chosen, according to the cache replacement policy, to be the place holder on a cache miss for a given set. Once a dirty block is "victimized", then data may be read out of the dirty victim and latched into the write back buffer 210. FIG. 2 illustrates that the write back buffer 210 receives from the data array 202 a 64-bit data signal (datum0) associated with first processing unit 104 and also receives from the data array 202 a 64-bit data signal (datum1) associated with second processing unit 106. The write back buffer also receives from the directory array 206 a data-out signal (rdata0) for first processing unit 104 and a data-out signal (rdata1) for second processing unit 106. The data-out signals (rdata0, rdata1) contain the tag address of the dirty block. FIG. 2 illustrates that the write back buffer 210 also receives a set_addr signal for each processing unit 104, 106, which indicates the set address for the dirty block. The set_addr signals are made up of all or part of the bits present in add_MPU0 and add_MPU1.

Figure 4:
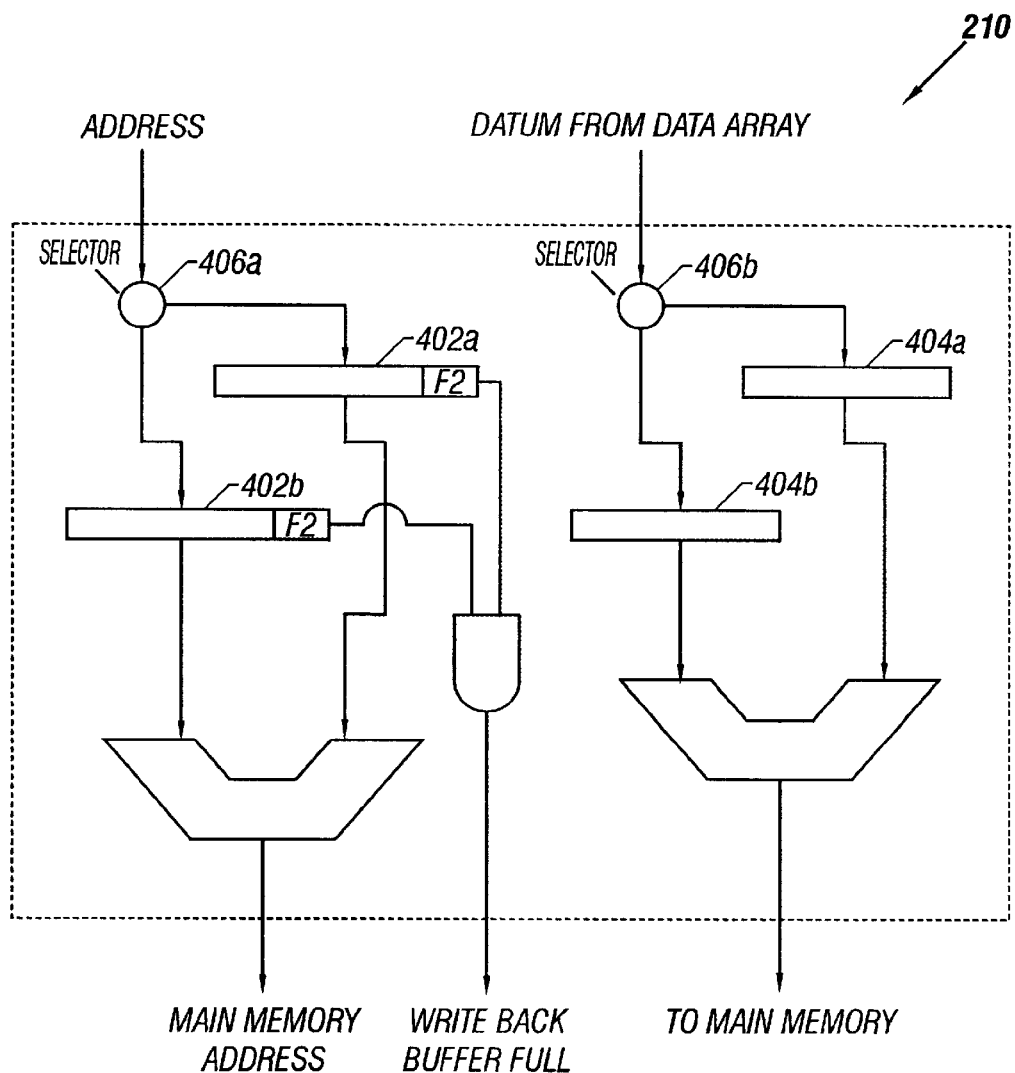
FIG. 4 shows a block diagram of a shared write back buffer of the data cache unit of FIG. 2.

FIG. 4 shows a block diagram of shared write back buffer 210. The write back buffer is shared by MPU0 104 and MPU1 106 (as is illustrated in FIG. 2) because there is only one write back buffer 210 in the data cache unit 102. FIG. 4 illustrates that the shared write back buffer 210 includes address bank 402, data bank 404, and selector circuit 406, which is controlled by the cache control logic (not shown). Data bank 404 of shared write back buffer 210 comprises two entries, each entry consisting of a cache-line-sized data register 404a, 404b. In the preferred embodiment, each data register 404a, 404b stores 256 bits of data that it receives from the data array 202. Similarly, address bank 402 of the write back buffer 210 also comprises two entries 402a, 402b, with each entry able to store the address of a dirty candidate that should be written back to main memory 108. One skilled in the art will recognize that the architecture of a write back buffer may have many variations, and should not be limited to the physical implementation depicted in FIG. 4. A write back buffer can have several levels. For instance, a shared write back buffer could be implemented in multiple levels, instead of the two-entry address bank 402 and data bank 404 illustrated in FIG. 4, with each MPU 104, 106 having a lower-level separate buffer that communicates with a higher-level shared buffer. Similarly, a shared write back buffer could have a shared write back buffer communicating with a lower-level split write back buffer. Furthermore, one skilled in the art will realize that, although the buffer components 402a, 402b, 404a, 404b, 406 are logically connected, they need not necessarily reside physically adjacent to each other within the processor architecture. (As an analogous example, one should note that, in the preferred embodiment, the fill buffer data registers 222a, 222b illustrated in FIG. 2 are logically associated with the fill buffer 208, but they are physically partitioned as part of the data array 202).

Address entries 402a, 402b further include an f bit, f1 and f2, respectively, that indicates whether each respective address entry 402a, 402b is full. For example, if both f1 and f2 are binary one, then write back buffer 210 is full. The f1 and f2 bits are set by control logic associated with the write back buffer 210. Shared write back buffer 210 provides signal "full" to the selection circuit 212 for use in the cache replacement policy described in more detail below.

The present invention's use of a single shared write back_buffer 210 comprising multiple data registers 404a, 404b and address entries 402a, 402b departs from prior art data cache units that contain a separate write back buffer allocated to each processor. The preferred embodiment of the present invention, with its shared write back buffer 210, provides for more efficient usage of the data registers 404a, 404b. Because write back operations slow or halt the operation of the data cache unit 102, providing a shared write back buffer 210 reduces delays in the operation of the data cache unit 102 by reducing write back operations. For instance, in a prior art system, when a first processor causes a write of a first data word to an associated first write back buffer but the associated first write back buffer is filled to capacity, a data word stored in the first write back buffer is written back to memory. In contrast, FIG. 4 illustrates that the present invention provides a second register 404b with capacity to store a data word. Applying the above example to the present invention, the write back operation could be avoided by writing the first data word to the second data register 404b. If both entries of the write back buffer 210 is full, then it operates in a first-in-first-out (FIFO) fashion. A data word that arrives when the write back buffer 210 is full causes write back buffer 210 to write the oldest data word stored in the write back buffer back to main memory 108.

A further advantage of the shared write back buffer design of the present invention is that it requires less hardware compared to that necessary for systems comprising separate write back buffers for each processor. A single write back buffer 210 allows use of a single line to connect the write back buffer 210 to memory 108 and eliminates the need for logic to coordinate the access of multiple buffers to memory. In other words, the shared write back buffer 210 requires no logic to coordinate which write back buffer writes to memory at a given time.

Still referring to FIG. 4, control logic associated with the write back buffer 210 implements the buffer 210 as a circular queue to effect the FIFO operation discussed above. This control logic, labeled in FIG. 4 as selector circuit 406, comprises address selector circuit 406a and data selector circuit 406b. Address selector circuit 406a determines which address bank 402 to store an incoming address. Data selector circuit 406b determines which data bank 404 an incoming data word is stored in.

Figure 6:
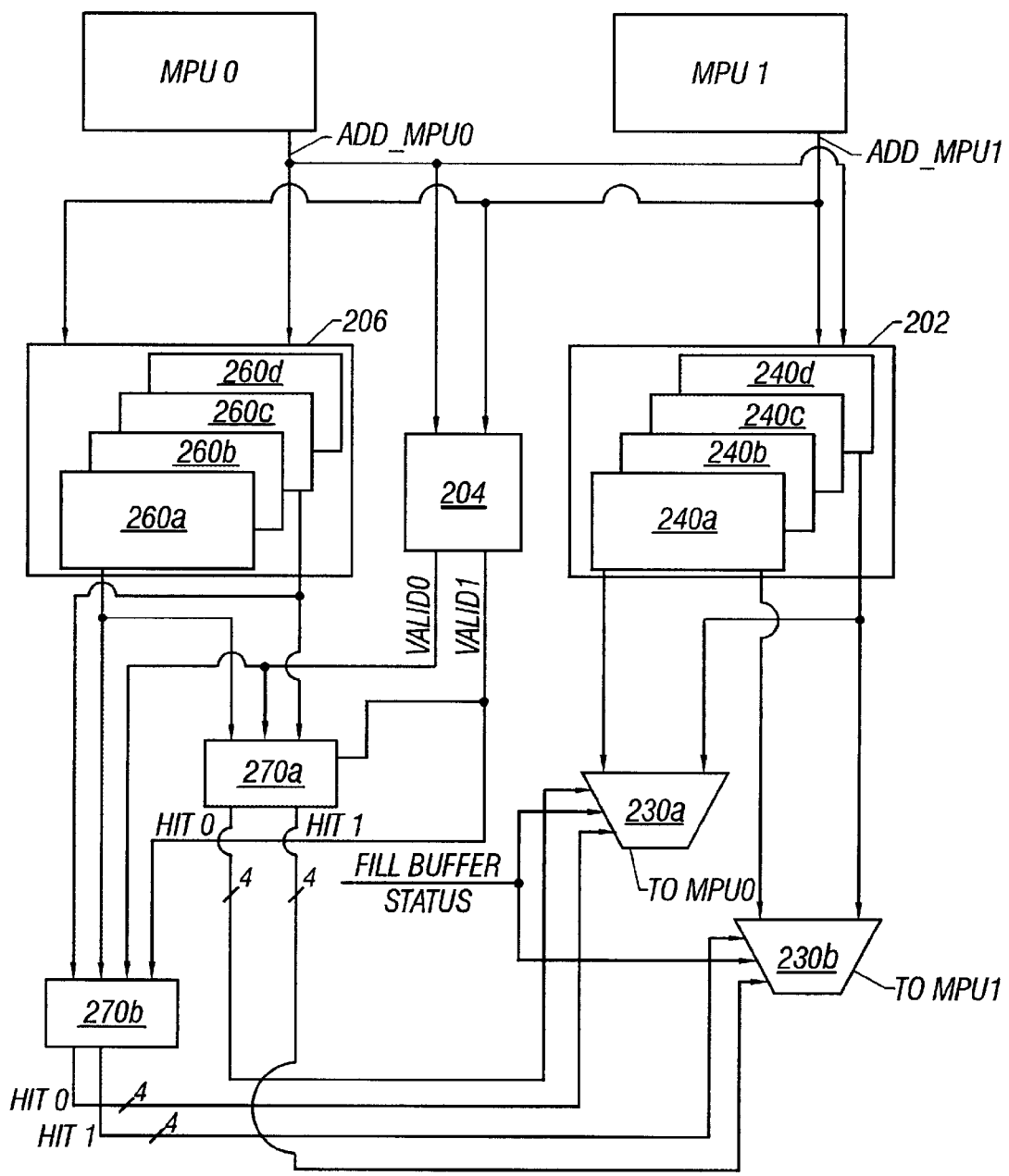
FIG. 6 shows two logical banks of a data array of the data cache unit of FIG. 2.

The present invention requires that the above-described constituent components of the data cache unit 102 perform various functions. Two of these functions are the hit/miss calculation and application of the cache replacement policy when a miss occurs. To aid the discussion of these functions, FIG. 6 shows portions of the data cache unit 102: directory array 206, data array 202, and status array 204. While each data array 202 includes four logical banks 240a–240d in the preferred embodiment, FIG. 6 shows only the operation of two logical banks 240a and 240d for clarity of illustration. Similarly, although the preferred embodiment of directory array 206 comprises four logical banks 260a–260d, the operation of only two, 260a and 260c, are shown in FIG. 6.

The hit/miss logic is triggered by a request for load or store access from the MPU 104, 106 to the data cache unit 102. When a load or store access is requested by an MPU 104, 106, the MPU must specify an address for the memory location to be accessed. FIG. 6 illustrates that MPU0 and MPU1 each provide a 32-bit main memory address (respectively, "add_MPU0" and "add_MPU1") to directory array 206, data array 202, and status array 204. In this example, a data word having a unique main memory address can be stored in only a single set but among any of two ways. Each main memory address is converted into a set number, either a 0 or 1, in a conventional manner. In response to the set number, each of the two logical banks 240a, 240d of data array 202 provide data to respective multiplexers 230a and 230b, corresponding to data requested by respective MPU0 and MPU1. Simultaneously, in response to the set number, each of the two logical banks, 260a and 260b, of directory array 206 provide main memory addresses (so-called "directory addresses") to respective comparators 270a and 270b.

Status array 204 provides to comparators 270a and 270b a "valid0" signal for data accesses by MPU0 and a "valid1" signal for data accesses by MPU1. A high value on these signals indicates that the respective way is valid and therefore is not a good candidate to be overwritten. Signals "valid0" and "valid1" are derived from a status word, shown in FIG. 3, that indicates information about each way of each set.

When a comparator 270a, 270b receives a matching "add_MPU0" and directory address as well as "valid0" indicating the way is valid, it issues signal "hit0" to multiplexer 230a of data array 206 to select an output from the two logical banks 240a and 240b of data array 202 to provide to MPU0 104. A similar operation occurs for MPU1 106, where the comparator 270a, 270b that receives a matching "add_MPU1" and directory address as well as "valid1" indicating the way is valid, issues signal "hit1" to multiplexer 230b to select an output from the two logical banks 240a, 240b of data array 202 to provide to MPU1 106.

Directory array 206 also provides a positive "cache hit0" signal or "cache_hit1" signal (shown in FIG. 1) to the respective MPU0 104 or MPU1 106 to indicate to the requesting MPU that a cache hit has occurred. Otherwise, directory array 206 indicates to the requesting MPU that the requested data word is not present in data cache unit 102 (i.e., a cache miss) through a low value of signal "cache_hit0" or "cache_$_{hit}$1".

Figure 7:
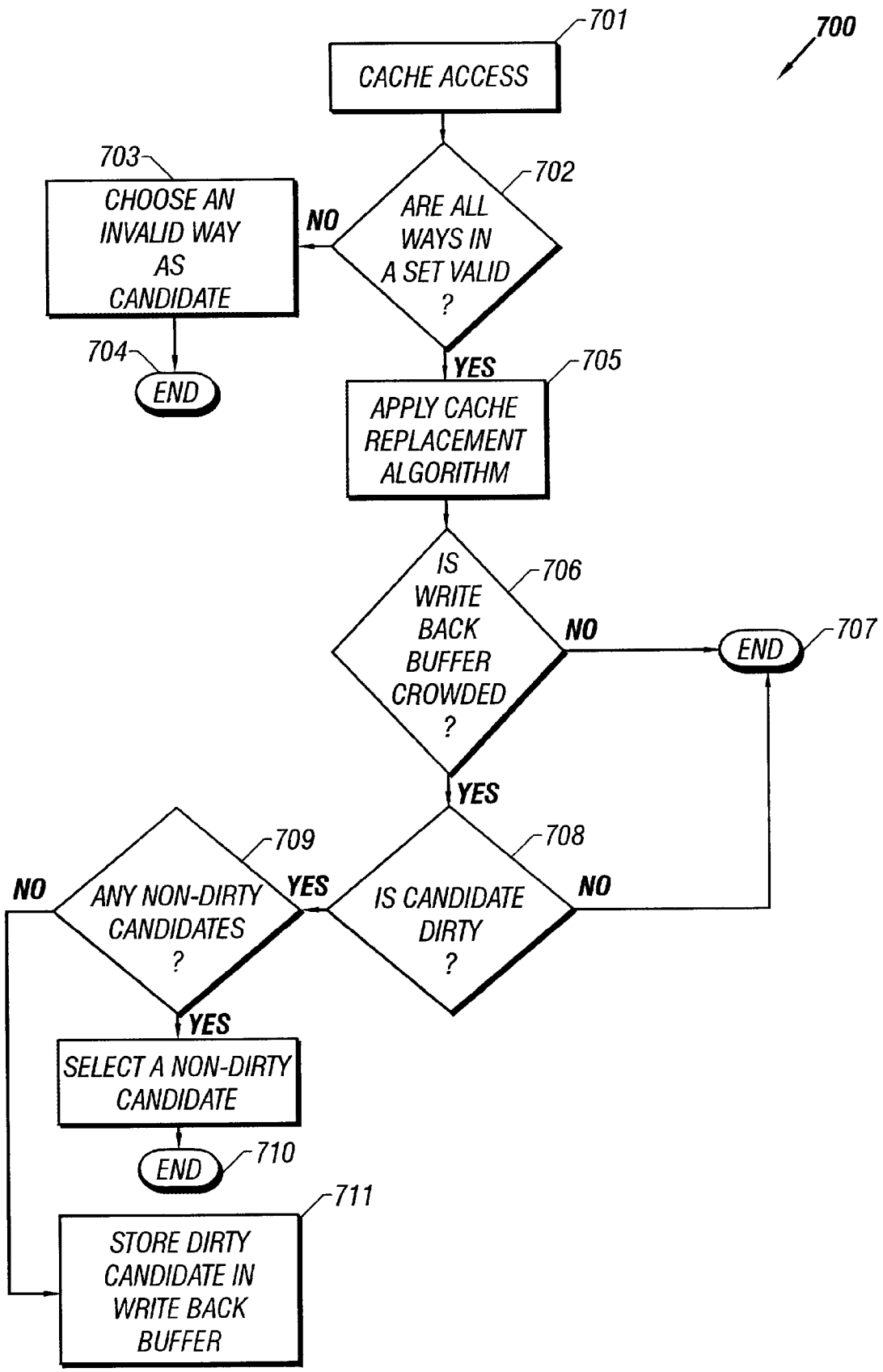
FIG. 7 shows at least one embodiment of a cache replacement operation.

FIG. 7 illustrates the cache replacement policy 700 that is performed by the selection circuit 212 at the same time that the data cache unit 102 performs the above-described hit/miss logic. The two functions are performed in parallel so that the victim number will be available in the case of a cache miss. The policy 700 is a process that selects a way to serve as a candidate to be overwritten, while attempting to avoid writing a dirty candidate into the write back buffer 210. Where the write back 210 buffer is crowded, writing a dirty candidate into the write back buffer triggers a time-consuming write back operation. Selection circuit 212 determines dirty candidates for the first processing unit 104 and the second processing unit 106 simultaneously.

Still referring to FIG. 7, a request from an MPU 104, 106 to access the cache triggers performance of the cache replacement policy 700. The initial step 702 in the process is to determine whether all four ways corresponding to the address associated with the potential miss are valid. The selection circuit 212 accomplishes this by accessing the status word of FIG. 3, which indicates which ways for a particular set are valid. If a way is valid, it is not as a good candidate for being overwritten as a way that does not contain meaningful data. Thus, if any ways associated with the set of interest are not valid, then the selection circuit 212 selects an invalid way in step 703 as a candidate to be overwritten in a subsequent cache store. Choosing the candidate in 703 includes analyzing the highest way number (3) to the lowest way number (0) and selecting the highest way number that is marked as invalid in the status word. The process then ends at completion step 704.

If all ways are valid, then the data cache unit 102 has no choice but to overwrite a valid way in the case of a miss. In such case, it is preferable to select a way that will not trigger a write back operation. In other words, it is preferable to select a valid way that is not dirty. To do so, the selection circuit 212 first performs any traditional cache replacement algorithm in step 705, such as the NMRU algorithm. To facilitate step 705, Bits R1 and R2 of the status word of FIG. 3 together represent a reference way, with 00 in bits R1 and R2 representing the least significant way and 11 representing the most significant way. For instance, to apply the NMRU algorithm, bits R1 and R2 represent the most recently accessed way. To apply the LRU algorithm, bits R1 and R2 represent the least recently used way.

FIG. 7 shows that, once the potential candidate is identified by step 705, step 706 determines whether the write back buffer is crowded. This determination is made by the selection circuit 212, which analyzes the full signal provided by the write back buffer 210 and also analyzes other indicators of crowdedness, such as unacceptably long cycle time to load the write back buffer 210. If the write back buffer 210 is crowded, then the selection circuit 212 determines in step 708 whether the potential candidate identified in step 705 is dirty. One skilled in the art will recognize that the order of steps 705, 706, and 708 are not critical. Rather, any combination of steps may be performed, as long as the combination selects a candidate and determines whether (candidate is dirty) AND (write buffer is full). In alternative embodiments, one might perform step 706 before 708. In another alternative embodiment, one might check if the write buffer is crowded 706 before applying the cache replacement algorithm.

If the shared write back buffer 210 is not full then the process 700 ends at completion step 707. In such case, a write back operation will not be triggered because a candidate has been identified, and there is room in write back buffer 210 if the candidate should prove to be dirty. If, on the other hand, the write back buffer is crowded, then additional processing must be performed if the candidate identified in step 705 is dirty. Accordingly, FIG. 7 illustrates that the selection circuit 212 determines whether the candidate is dirty in step 708, which is only performed after a candidate has been selected in step 705 AND the selection circuit 212 has determined in step 706 that the write back buffer 210 is crowded. To determine whether a candidate is dirty, the data cache unit 201 determines whether the candidate differs from its parent with the same address in main or secondary memory. If they differ, then the candidate is "dirty" and the parent must be replaced with the dirty candidate in a write back operation. The corresponding status word status0 or status1 indicates which ways are "dirty" by bits D0–D3. If the candidate is not dirty, then the process completes at completion step 707 because the parent need not be updated. The candidate is that identified during determination step 705.

FIG. 7 illustrates that, if the candidate is identified as dirty in step 708, the selection circuit attempts to identify a non-dirty candidate in order to avoid triggering a write back operation. FIG. 7 illustrates that, if a dirty candidate has been identified AND the write back buffer 210 is crowded, then the selection circuit 212 checks in step 709 to determine if a non-dirty candidate exists for the set. The "dirty" bits D0–D3 for other three ways of the dirty candidate are examined in step 709 to determine whether the remaining three ways are dirty. If any non-dirty ways exist, one is chosen as the candidate and the process 700 ends at completion step 710. The dirty candidate becomes a non-candidate, thus avoiding storage of a dirty candidate into write back buffer 210, which would trigger a write back operation where shared write back buffer 210 is crowded.

But if all ways are dirty and the write back buffer is crowded, then the dirty candidate chosen in step 705 is as good a choice as any and no new candidate is chosen. This will result in the dirty candidate being overwritten with the new data selected by the processor, so the current contents of the candidate is therefore stored in the write back buffer 210 in step 711. If shared write back buffer 210 is full, then the contents of the write back buffer are written back to their associated main memory locations and subsequently the dirty candidate is placed into the write back buffer.

After the candidate is chosen, selection circuit 212 updates the status word associated with the candidate to indicate a miss in the way of the candidate. Setting the miss bit for a particular way indicates that the way was chosen as the candidate for a prior cache miss. Selection circuit 212 generates the 4-bit signals "miss0" and "miss1" to indicate which way associated with addresses provided by respective MPU0 and MPU1 are to be marked as a miss. Selection circuit 212 implements process 700 of FIG. 7.

Selection circuit 212 receives the miss signal miss0 and alters the status word of the candidate associated with MPU0 so that appropriate miss bit M0, M1, M2, or M3 is set according to which way "miss0" represents. Similarly, selection circuit 212 responds to the miss signal "miss1" by altering the status word of the candidate associated with MPU1 so that appropriate miss bit M0, M1, M2, or M3 is set according to which way "miss1" represents. The status words provided by converter 504 to status array 204 overwrite status words corresponding to "add_MPU0" and "add_MPU1" that caused the cache miss.

Referring to FIG. 2, the updated status word status0 is routed to the status array 204. Subsequently, the candidate chosen during execution of the cache replacement policy 700 is overwritten in a cache refill operation. Fill buffer 208 stores data written into the data cache unit 102 on a cache miss. Using the way candidate determined in the cache replacement policy 700, data from the bottom (i.e., "first in") entry of the appropriate address register 222 is written to the data array 202. Subsequently, the miss bit in the status word associated with the overwritten data word is returned to 0 to indicate no miss is associated with the data word. FIGS. 1 and 2 illustrate that MPU0 104 and MPU1 106 share fill buffer 208, write back buffer 210, and the other resources making up the data cache unit 102. This scheme makes it is possible for multiple processing units, such as MPU0 104 and MPU1 106, to request access to the same resource, or storage space within the same resource. When the multiple processing units request access to the same resource during the same cycle, the requests are said to "collide," creating a collision. In other words, a "collision" occurs when two processing units attempt to access the same resource during the same cycle. The contention that results in a collision can occur, for instance, when multiple processors try to access the fill buffer 208 during the same cycle, when multiple processors attempt to access the shared write-back buffer 210 during the same cycle, and when multiple processors attempt to write to the same memory address (or cache line) or perform a BLKZERO instruction on the same cache line during the same cycle. A collision can also occur when, for instance, during the same cycle, one processing unit attempts to store to an address in a resource of the data cache unit 102 and another processing unit attempts to perform a load from the same location. As another example, a collision can also occur when both processing units attempt to perform a load access to the same address. In this situation, the value of add_MPU0 and add_MPU1 is the address at issue, as is any subset thereof (such as, for instance, the set address contained in add_MPU0 or add_MPU1). Although it would not at first appear that a collision could occur on a load operation, since a load does not write to memory, the collision occurs in the updating of the status words. The status words are updated for load operations, and if two processors attempt to write to the same status word during the same cycle, a collision will occur.

Figure 8:
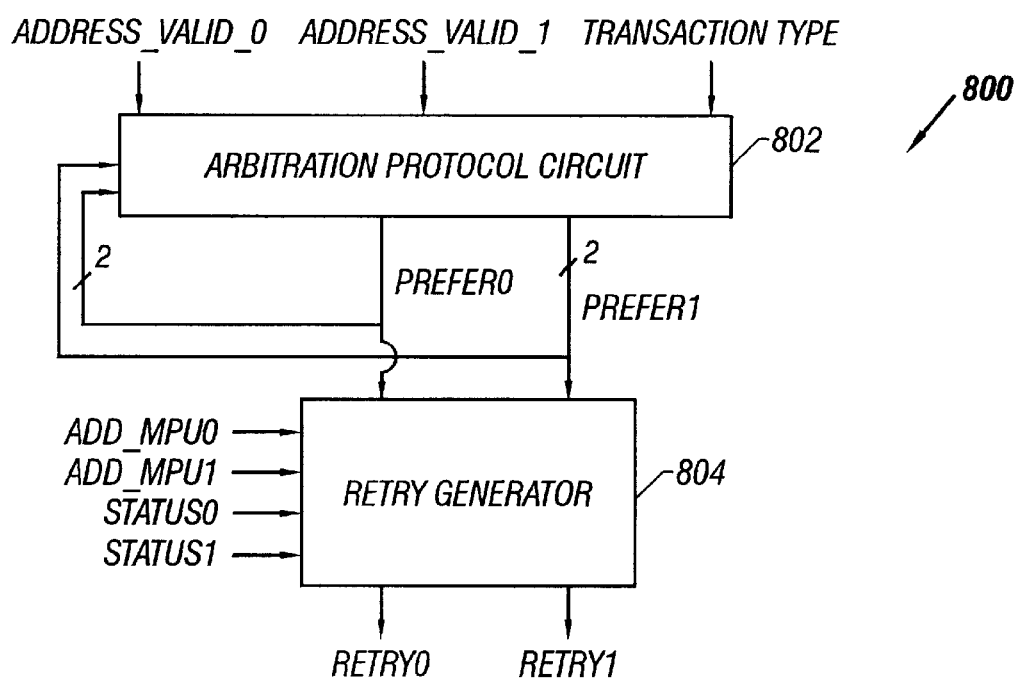
FIG. 8 shows at least one embodiment of an arbitration circuit.

FIG. 8 shows an arbitration circuit 800 that enables the data cache unit 102 to efficiently handle colliding requests to access a shared resource from multiple processing units. The arbitration circuit 800, for use by or within data cache unit 102, includes an arbitration protocol circuit 802 and a retry signal generator 804. The arbitration protocol circuit 802 resolves which processing unit may obtain access to the contention resource when a collision occurs.

For example, MPU0 104 and MPU1 106 may trigger a cache miss and have dirty candidates to store in the write back buffer 210. In such case, the arbitration protocol circuit 802 receives signals "address_valid0" and "address_valid1" from respective processing units. Signals "address_valid0" and "address_valid1" represent whether addresses provided by respective processing units are valid. The address_valid indicators notify the arbitration protocol circuit 802 that it is necessary to "arbitrate" simultaneous processor requests for access to the same resource. That is, the arbitration protocol circuit 802 must determine which processor's request will be honored during the applicable cycle. This type of collision is detected by the arbitration protocol circuit 802 by making a comparison of add_MPU0 and add_MPU1, or a subset of the bits therein, when address_valid0 and address_valid1 are both set. If the address bits indicate that each processor is attempting to access the same address, and the addresses are valid, then arbitration is necessary.

The arbitration protocol circuit 802 can also detect a second type of collision. In some cases, a collision occurs regardless of the values of the MPU address values. When two processors attempt to access the write buffer or fill buffer during the same cycle, a collision occurs. It is not necessary to compare the two MPU address values in such case. Instead, the arbitration protocol circuit 802 receives a transaction-type indicator from each processing unit. If the transaction-type indicators indicate that multiple processing units have attempted to access the write buffer or fill buffer during the same cycle, a collision has occurred regardless of the MPU address values.

After making its determination that a collision has occurred, the arbitration policy circuit makes a determination as to which processor will be allowed to make the requested access. The default arbitration protocol implemented in the preferred embodiment of the arbitration protocol circuit 802, in order to determine which processor will receive the requested access, is discussed in further detail below. After it has made the determination of which processor will receive the requested access, the arbitration protocol circuit 802 generates 2-bit signals "prefer0" and "prefer1" that respectively represent which processor's attempted access will be preferred during the applicable cycle. Prefer0 is designed to be the logical complement of prefer1, and vice versa, such that both should never be set at the same time. The value for the preferred MPU is the opposite of the value for the non-preferred MPU. These "prefer0" and "prefer1" indicators are retained by the arbitration protocol circuit 802 for its next iteration, to help determine which processing unit should be favored on the next collision. Arbitration protocol circuit 802 provides signals "prefer0" and "prefer1" to the retry signal generator 804.

Retry signal generator 804 generates signals "retry0" and "retry1" based on the value of the "prefer0" and "prefer1" indicators. If the "prefer" indicator for an MPU indicates that the MPU's requested access will be honored in the applicable cycle, then no retry is necessary, and the retry signal generator 804 will so indicate with the appropriate "prefer" indicator. In contrast, the retry signal generator 804 indicates with the value of the "retry" indicator to the non-preferred MPU that a retry is necessary. Indication that a retry is necessary notifies the non-preferred processing unit to ignore data returned in response to the attempted data cache unit 102 access and to retry the load or store access.

Regarding the arbitration protocol, the present invention implements in the arbitration protocol circuit 802 a default arbitration protocol for store collisions to the fill buffer 208, an arbitration protocol for store collisions to the shared write back buffer 210, an arbitration protocol for load collisions, and an arbitration protocol for load/store collisions. The arbitration protocol circuit 802 performs one of the policies based on the values of transaction type indicators received by the arbitration circuit 800 from each processing unit 104, 106. These default policies, described below, are not strict "fairness" policies, because they do not necessarily prefer the processing unit that was non-preferred on the last collision. Instead, the arbitration protocol circuit 802 usually attempts to prefer the processing unit that has been non-preferred more often than the other processing unit (except that loads are always preferred over stores). This preference is implemented by performing a repeated selection pattern where each processing unit is preferred during a predetermined number of sequential collisions. The default policies described below are programmable and therefore may be altered to adjust the default policy, implement a strict fairness policy, or implement any other preferable arbitration protocol.

Arbitration circuit 800 includes an arbitration protocol for attempts by multiple processing units to load from the same address space in data cache unit 102 during the same cycle. In such case, the arbitration protocol circuit 802 allows the first processing unit 104 access in the desired address space in a predetermined number of sequential collisions (M) and allows the second processing unit 106 access to the desired address space in a predetermined number of sequentially-following sequential collisions (N). In the preferred embodiment, the first processing unit receives access to the desired address space in the first and second sequential collisions (i.e., M=2), with the second processing unit gaining access to the desired address space in the third and fourth sequential collisions (i.e., N=2). In the first and second simultaneous attempts to load from the same address space in data cache unit 102 by the first and second processing units, the first processing unit 104 is allowed to load requested data. The retry generator 804 supplies "retry1" signal to MPU1, informing MPU1 to retry the access and to ignore the data returned in response to the attempted access of the data cache unit. In the sequentially following third and fourth colliding attempts to load from the same address space in data cache unit 102 by the first and second processing units 104, 106, second processing unit 106 is allowed to load requested data and retry generator 804 supplies a "retry0" signal to the first processing unit 104, informing the first processing unit 104 to retry the access and to ignore data returned in response to the attempted access of the data cache unit.

Arbitration circuit 800 also includes an arbitration protocol to resolve collisions involving stores to the data register of fill buffer 208. Where the first processing unit 104 and the second processing unit 106 both request during the same cycle that main memory 108 write data to the data register of fill buffer 208, the arbitration protocol favors the first processing unit in N sequential collisions and the second processing unit 106 in the following M sequential collisions. Again, in the preferred embodiment, M and N are equal to two (2). For example, in first and second colliding requests to write to the data register of fill buffer 208 by first and second processing units, the request by the first processing unit 104 is allowed. The retry generator 804 provides signal "retry1" to the second processing unit 106 informing the second processing unit 106 to retry the write. In sequentially following third and fourth colliding requests to write to the data register of fill buffer 208 by the first and second processing units 104, 106, the request by the second processing unit 106 is allowed and the retry generator 804 supplies a "retry0" signal to the first processing unit 104, informing the first processing unit 104 to retry the write operation.

Arbitration circuit 800 also includes an arbitration protocol to resolve collisions involving stores to shared write back buffer 210. Where MPU0 and MPU1 trigger a cache miss and require that a dirty candidate be stored in write back buffer 210, the fairness protocol favors the first processing unit 104 in M sequential collisions and the second processing unit 106 in the following N sequential collisions. In the preferred embodiment, M and N are equal to two (2). For example, in first and second colliding requests by the first and second processing units 104, 106 to store dirty candidates in shared write back buffer 210, the first processing unit's 104 dirty candidate is stored. The retry generator 804 provides signal "retry1" to MPU1 informing the second processing unit 106 to retry the storage request. In sequentially-following third and fourth colliding requests by the first and second processing unit 104, 106 to store dirty candidates in shared write back buffer 210, the second processing unit's 106 dirty candidate is stored. The retry generator 804 provides signal "retry0" to the first processing unit 104 informing the first processing unit 104 to retry the storage request.

There are also instances where the first and second processing units 104, 106 both attempt during the same cycle to store and load to the same location in shared write back buffer 210, fill buffer 208, or other location in the data cache unit 102. Load and store operations cannot be performed to the same location simultaneously. In such cases, load operations are favored over store operations and the processing unit that requests a store operation will be told to retry through the "retry" signal generated by the retry generator 804. Load operations occur much more frequently than store operations. Thus load operations are favored over store operations to minimize delays in the operation of the data cache unit 102.

OTHER EMBODIMENTS

The above-described embodiments of the present invention are illustrative and not limiting. It will thus be obvious to those skilled in the art that various changes and modifications may be made without departing from this invention in its broader aspects.

For example, the fill buffer and data array can store larger or smaller amounts of data than in the specific embodiments disclosed. Also for example, more media processor units may share use of the data cache unit. Also for example, the discussed connections are descriptive and do not limit other connections or other size connections within system 100.

As another example, the shared resources considered in the cache replacement policy are not limited to the write back buffer. In addition to, or instead of, the write back buffer, other shared resources that may be considered include a cross bar switch, memory controller, and memory controller buffers.

We claim:

1. A computer system comprising:

a plurality of processing units;

a main memory;

a shared write back buffer that stores storage data to be written to said main memory, wherein said shared write back buffer is coupled to receive said storage data from any processing unit included in said plurality of processing units; and a data cache unit, wherein said data cache unit includes said write back buffer, a directory array, and a data array;

wherein said shared write back buffer further includes:

a plurality of address inputs, wherein each said address input is configured to receive an address data originating from one of said plurality of processing units;

a plurality of storage data inputs, wherein each said storage data input is configured to receive storage data originating from one of said plurality of processing units, each said address data being associated with one of said storage data and also being associated with a corresponding address in said main memory;

a data bank that includes a plurality of data registers;

an address bank that includes a plurality of address registers; and an output port that is configured to provide said storage data from said data bank to said main memory.

2. The computer system of claim 1 wherein said plurality of storage data inputs are configured to receive said storage data from said data array.

3. The computer system of claim 1 wherein said plurality of address inputs are configured to receive said address data from said directory array.

4. A data cache unit comprising:

a directory array;

a data array; and a shared write back buffer, wherein said shared write back buffer further includes:

a plurality of address inputs, wherein each said address input is configured to receive an address data originating from one of a plurality of processing units;

a plurality of storage data inputs, wherein each said storage data input is configured to receive storage data originating from one of said plurality of processing units, each said address data being associated with one of said storage data and also being associated with a corresponding address in a main memory;

a data bank that includes a plurality of data registers;

an address bank that includes a plurality of address registers; and an output port that is configured to provide said storage data from said data bank to said main memory.

5. The data cache unit of claim 4 wherein said plurality of storage data inputs are configured to receive said storage data from said data array.

6. The data cache unit of claim 4 wherein said plurality of address inputs are configured to receive said address data from said directory array.

7. A computer system comprising:

a plurality of processing units;

a main memory;

buffer means for storing storage data to be written to said main memory, wherein said buffer means further comprises means for receiving said storage data from any processing unit included in said plurality of processing units; and a data cache unit, wherein said data cache unit includes said buffer means, a directory array, and a data array;

wherein said buffer means further includes:

means for receiving an address data originating from one of said plurality of processing units;

means for receiving a storage data originating from one of said plurality of processing units, each said address data being associated with one of said storage data and also being associated with a corresponding address in said main memory; and means for providing said storage data to said main memory.

* * * * *